(12) United States Patent
   Choi

(10) Patent No.: US 9,990,862 B2
(45) Date of Patent: Jun. 5, 2018

(54) ACTIVE COLONOSCOPY TRAINING MODEL AND METHOD OF USING THE SAME

(71) Applicant: Ohio University, Athens, OH (US)

(72) Inventor: Junghun Choi, Athens, OH (US)

(73) Assignee: Ohio University, Athens, OH (US)

(*) Notice: Subject to any disclaimer, the term of this patent is extended or adjusted under 35 U.S.C. 154(b) by 829 days.

(21) Appl. No.: 14/363,175

(22) PCT Filed: Dec. 3, 2012

(86) PCT No.: PCT/US2012/067553
§ 371 (c)(1),
(2) Date: Jun. 5, 2014

(87) PCT Pub. No.: WO2013/085832
PCT Pub. Date: Jun. 13, 2013

(65) Prior Publication Data
US 2014/0349266 A1    Nov. 27, 2014

Related U.S. Application Data

(60) Provisional application No. 61/567,177, filed on Dec. 6, 2011.

(51) Int. Cl.
G09B 23/30    (2006.01)
G09B 23/28    (2006.01)
(Continued)

(52) U.S. Cl.
CPC ......... G09B 23/285 (2013.01); G09B 23/281 (2013.01); G09B 23/288 (2013.01);
(Continued)

(58) Field of Classification Search
CPC ........ G09B 23/30; G09B 23/32; G09B 23/34; G09B 23/281; G09B 23/288; G09B 23/303; G09B 23/306; G09B 23/285
(Continued)

(56) References Cited

U.S. PATENT DOCUMENTS 6,857,878 B1* 2/2005 Chosack .............. G09B 23/285
                                                        434/262
2004/0126746 A1* 7/2004 Toly ....................... G09B 23/28
                                                        434/262
(Continued)

FOREIGN PATENT DOCUMENTS

AU    2010284771 A1    4/2012
CN    202178009 U      3/2012
(Continued)

OTHER PUBLICATIONS

Prepared by: Technology Assessment Committee; Carpenter, S., Petersen, B. T., Chuttani, R., Croffie, J., Disario, J., Liu, J., Mishkin, D., Shah, R., Somogayi, L., Tierney, W., and Wong Kee Song, L. M., 2007, "Polypectomy Devices," Gastrointestinal Endoscopy, 65(6) pp. 741-749.
(Continued)

*Primary Examiner* — James Hull
(74) *Attorney, Agent, or Firm* — Wood Herron & Evans LLP

(57) ABSTRACT

An active colonoscopy training model (10) and method of using the same with a colonoscope (60) includes an abdominal model (12), a colorectal tube (16) configured to replicate a human colon, and at least one sensor operably coupled to the colorectal tube (16). The abdominal model (12) comprises an outer body (14) having a hollow interior portion (22), and the colorectal tube (16) is operably coupled to the abdominal model (12) within the interior portion (22). The colorectal tube (16) is configured to receive the colonoscope
(Continued)

(60), and the at least one sensor measures one or more of a tension, a force, a pressure, a light, and a position of the colonoscope (60) when the colonoscope (60) is positioned and advanced through the colorectal tube (16).

13 Claims, 11 Drawing Sheets

(51) Int. Cl.
    *G09B 23/34* (2006.01)
    *G09B 23/32* (2006.01)
(52) U.S. Cl.
    CPC ........... *G09B 23/30* (2013.01); *G09B 23/303* (2013.01); *G09B 23/306* (2013.01); *G09B 23/32* (2013.01); *G09B 23/34* (2013.01)
(58) Field of Classification Search
    USPC .......................................................... 434/272
    See application file for complete search history.

(56) References Cited

U.S. PATENT DOCUMENTS

| | | | |
|---|---|---|---|
| 2004/0248072 | A1 | 12/2004 | Gray et al. |
| 2005/0042587 | A1 | 2/2005 | Wallaker |
| 2008/0032273 | A1* | 2/2008 | Macnamara ......... G09B 23/285 434/262 |
| 2009/0263775 | A1* | 10/2009 | Ullrich ................... G09B 23/32 434/267 |
| 2012/0178062 | A1 | 7/2012 | Flaction et al. |
| 2012/0189997 | A1 | 7/2012 | Whittemore et al. |

FOREIGN PATENT DOCUMENTS

| | | | | |
|---|---|---|---|---|
| DE | 3834553 | A1 * | 4/1990 | ........... G09B 23/285 |
| DE | 19716341 | A1 | 10/1998 | |
| EP | 2479738 | A1 | 7/2012 | |
| GB | 2418521 | A | 3/2006 | |
| KR | 20030085683 | A | 11/2003 | |
| KR | 100802136 | B1 | 2/2008 | |
| KR | 20090066453 | A | 6/2009 | |
| WO | 2004015654 | A1 | 2/2004 | |
| WO | 2009094621 | A2 | 7/2009 | |

OTHER PUBLICATIONS

Byers, T., Levin, B., Rothenberger, D., Dodd, G.D., Smith, R.A., 1997, "American Cancer Society Guidelines for Screening and Surveillance for Early Detection of Colorectal Polyps and Cancer: Update 1997," CA: A Cancer Journal for Clinicians, 47(3) pp. 154-160.
Rabeneck, L, Souchek, J., and El-Serag, H. B., 2003, "Survival of Colorectal Cancer Patients Hospitalized in the Veterans Affairs Health Care System," The American Journal of Gastroenterology, 98(5) pp. 1186-1192.
Baillie, J., and Ravich, W. J., 1993, "On Endoscopic Training and Procedural Competence," Annals of Internal Medicine, 118(1) pp. 73-74.
Hogan, W. J., 1993, "What Constitutes Endoscopic Competence?," Gastroenterology, 104(5) pp. 1564-1565.
Marshall, J. B., 1995, "Technical Proficiency of Trainees Performing Colonoscopy: A Learning Curve," Gastrointestinal Endoscopy, 42(4) pp. 287-291.
Jones, I. T., 1998, "Training in Colonoscopy: A Personal View," Australian and New Zealand Journal of Surgery, 68(5) pp. 316-317.
Dunkin, B. J., and Joseph, R. A., 2010, "Lower Endoscopy," ACS Surgery: Principles and Practice, pp. 1-16.
Church, J., Oakley, J., Milsom, J., Strong, S., and Hull, T., 2002, "Colonoscopy Training: The Need for Patience," ANZ Journal of Surgery, 72(2) pp. 89-91.

Teague, R. H., 2000, "Can we Teach Colonoscopic Skills?" Gastrointestinal Endoscopy, 51(1) pp. 112-114.
Okuda, Y., Bryson, E. O., DeMaria S. Jr., Jacobson, L., Quinones, J., Shen, B., and Levine, A. I., 2009, "The Utility of Simulation in Medical Education: What is the Evidence?" Mount Sinai Journal of Medicine: A Journal of Translational and Personalized Medicine, 76(4) pp. 330-343.
Bar-Meir, S., 2000, "A New Endoscopic Simulator," Endoscopy, 32(11) pp. 898-900.
Adamsen, S., 2000, "Simulators and Gastrointestinal Endoscopy Training," Endoscopy, 32(11) pp. 895-897.
Rex, D. K., 2000, "Colonoscopic Withdrawal Technique is Associated with Adenoma Miss Rates," Gastrointestinal Endoscopy, 51(1) pp. 33-36.
Peyton, R., 1996, "Education for educating surgeons. College has found Strong Demand for Training Programmes," BMJ: British Medical Journal, 312(7041) pp. 1301.
Wipf, J. E., Orlander, J. D., and Anderson, J. J., 1999, "The Effect of a Teaching Skills Course on Interns' and Students' Evaluations of their Resident-Teachers," Academic Medicine: Journal of the Association of American Medical Colleges, 74(8) pp. 938-942.
Marteau, T. M., Wynne, G., Kaye, W., and Evans, T. R., 1990, "Resuscitation: Experience without Feedback Increases Confidence but Not Skill," BMJ: British Medical Journal, 300(6728) pp. 849-850.
Sedlack, R. E., Baron, T. H., Downing, S. M., and Schwartz, A. J., 2007, "Validation of a Colonoscopy Simulation Model for Skills Assessment," The American Journal of Gastroenterology, 102(1) pp. 64-74.
Chak, A., Cooper, G. S., Blades, E. W., Canto, M., and Sivak, M.V. Jr, 1996, "Prospective Assessment of Colonoscopic Intubation Skills in Trainees," Gastrointestinal Endoscopy, 44(1) pp. 54-57.
Rex, D. K., Petrini, J. L., Baron, T. H., Chak, A., Cohen, J., Deal, S. E., Hoffman, B., Jacobson, B. C., Mergener, K., Petersen, B. T., Safdi, M. A., and Faigel, D. 0., 2006, "Quality Indicators for Colonoscopy," Gastrointestinal Endoscopy, 63(4) pp. S16-S18.
Appleyard, M. N., Mosse, C. A., Mills, T. N., Bell, G. A, Castillo, F. D., and Swain C. P., 2000, "The Measurement of Forces Exerted during Colonoscopy," Gastrointestinal Endoscopy, 52(2) pp. 237-240.
Cataldo, P. A., 1996, "Colonoscopy without Sedation," Diseases of the Colon & Rectum, 39(3) pp. 257-261.
Saunders, B. P., Fukumoto, M., Halligan, S., Masaki, T., Love, S., and Williams, C. B., 1994, "Patient-Administered Nitrous oxide/ oxygen Inhalation Provides Effective Sedation and Analgesia for Colonoscopy," Gastrointestinal Endoscopy, 40(4) pp. 418-421.
Fernandez-Sordo, J. O., Madrigal-Hoyos, E., and Waxman, I., 2011, "The Role of Live Animal Models for Teaching Endoscopy," Techniques in Gastrointestinal Endoscopy, 13(2) pp. 113-118.
Sedlack, R., Petersen, B., Binmoeller, K., and Kolars, J., 2003, "A Direct Comparison of ERCP Teaching Models," Gastrointestinal Endoscopy, 57(7) pp. 886-890.
Samur, E., Flaction, L., and Spaelter, U., Bleuler, H., 2008, "A Haptic Interface with Motor/Brake System for Colonoscopy Simulation," Haptic Interfaces for Virtual Environment and Teleoperator Systems, 2008, Madrid, Spain, pp. 477-478.
Samur, E., Flaction, L., and Bleuler, H., 2011, "Experimental Evaluation of a Haptic Interface for Endoscopic Simulation," World Haptics Conference (WHC), 2011 IEEE, Istanbul, Turkey, pp. 545-549.
Yi, S., Woo, H., and Ahn, W., Kwon, J.Y., and Lee, D.Y., 2006, "New Colonoscopy Simulator with Improved Haptic Fidelity," Advanced Robotics, 20(3) pp. 349-365.
Ahn, W., Kim, W., and Woo, H., Lee, K, Cho, J.H., Lee, D.Y. and Yi, S.Y., 2007, "Colonoscopy simulator with enhanced haptic realism and visual feedback," World Congress on Medical Physics and Biomedical Engineering 2006, pp. 3820-3823.
Woo, H. S., Kim, W. S., Ahn, W., Lee, D. Y., and Yi, S. Y., 2008, "Haptic Interface of the KAIST-Ewha Colonoscopy Simulator II," Information Technology in Biomedicine, IEEE Transactions, 12(6) pp. 746-753.
Yi, S. Y., Woo, H. S., Ahn, W., Joo, J.K., and Lee, D.Y., 2006, "Clinical Evaluation of a Colonoscopy Simulator with Improved

(56) References Cited

OTHER PUBLICATIONS

Haptics," IEEE Industrial Electronics, IECON 2006—32nd Annual Conference, Paris, France, pp. 4125-4129.

Aabakken, L., Adamsen, S., and Kruse, A., 2000, "Performance of a Colonoscopy Simulator: Experience from a Hands-on Endoscopy Course," Endoscopy, 32(11) pp. 911-913.

Sedlack, R. E., and Kolars, J. C., 2003, "Validation of a Computer-Based Colonoscopy Simulator," Gastrointestinal Endoscopy, 57(2) pp. 214-218.

Koch, A., Haringsma, J., Schoon, E., de Man, R.A., and Kuipers, E.J., 2008, "A Second-Generation Virtual Reality Simulator for Colonoscopy: Validation and Initial Experience," Endoscopy, 40(9) pp. 735-738.

Kale, R. and Choi, JH., 2011, "Localization of the Distal Tip in the Colonoscopy Training Model using Light Sensors," Journal of Medical Devices, 5(2).

Choi, J., Kale, R., Robert, R., and Drozek, D., 2011, "Preliminary Development of the Active Colonoscopy Training Model," Medical Devices: Evidence and Research, 4 pp. 59-70.

Anderson, P. E., Cook, A., and Amery, A. H., 1989, "A Review of the Practice of Fibreoptic Endoscopic Dilatation of Oesophageal Stricture," Annals of the Royal College of Surgeons of England, 71(2) pp. 124-127.

Riley, S. A., and Attwood, S. E. A., 2004, "Guidelines on the use of Oesophageal Dilatation in Clinical Practice," Gut, 53 (suppl 1) pp. i1-i6.

Haycock, A. V., Youd, P., Bassett, P., Saunders, B.P., Tekkis, P., and Thomas-Gibson, S., 2009, "Simulator Training Improves Practical Skills in Therapeutic GI Endoscopy: Results from a Randomized, Blinded, Controlled Study," Gastrointestinal Endoscopy, 70(5) pp. 835-845.

Mahmood, T., and Darzi, A., 2003, "A Study to Validate the Colonoscopy Simulator," Surgical Endoscopy, 17(10) pp. 1583-1589.

Dogramadzi, S., Virk, G. S., Bell, G. D., Rowland, R.S., and Hancock J., 2005, "Recording Forces Exerted on the Bowel Wall during Colonoscopy: In Vitro Evaluation," The International Journal of Medical Robotics and Computer Assisted Surgery, 1(4) pp. 89-97.

Witte, T.N., Enns, R., 2007, Current Endoscopic Practices—The Experts Speak, "The difficult colonoscopy", Can J Gastroenterol vol. 21, No. 8, pp. 487-490.

\* cited by examiner

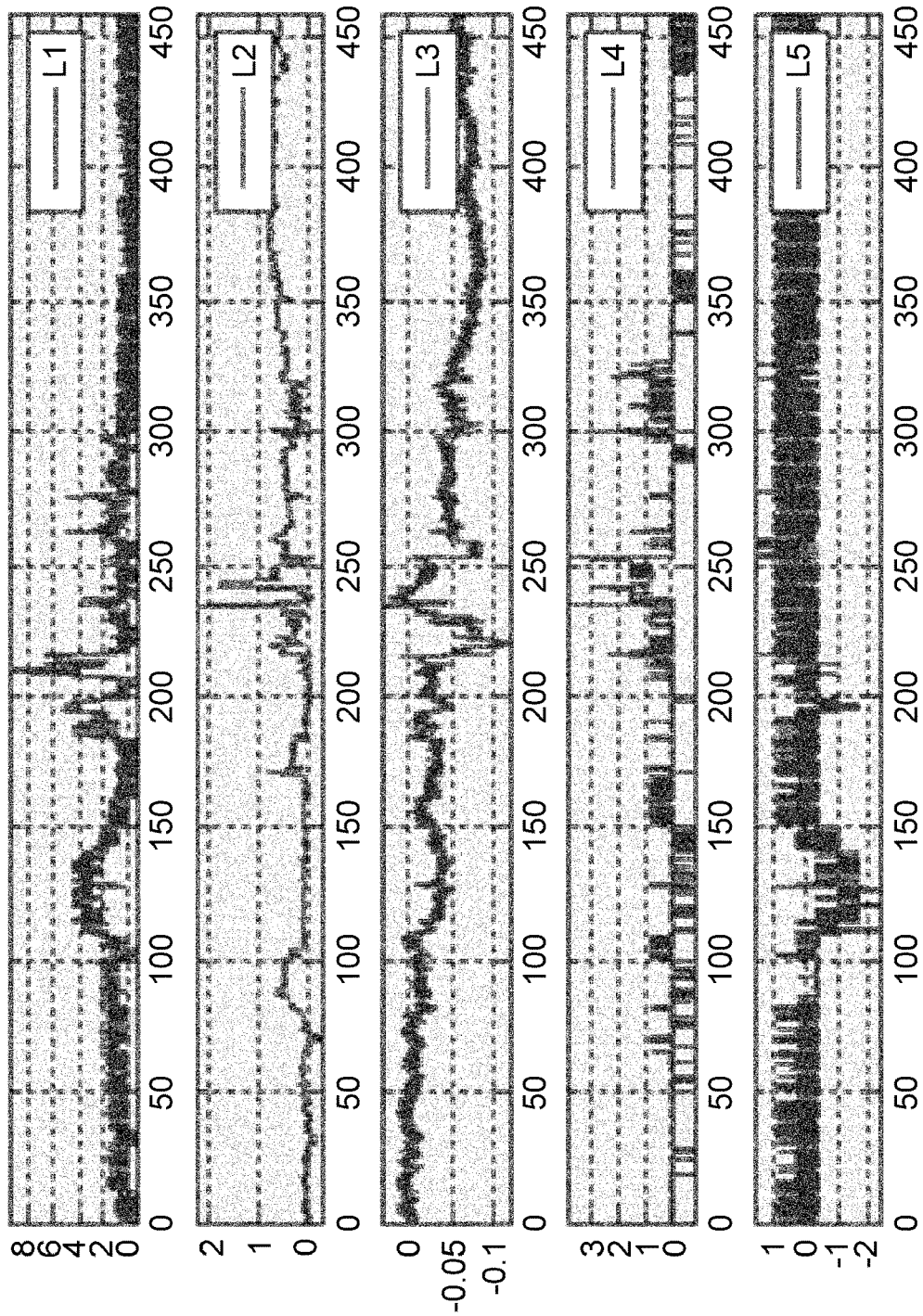

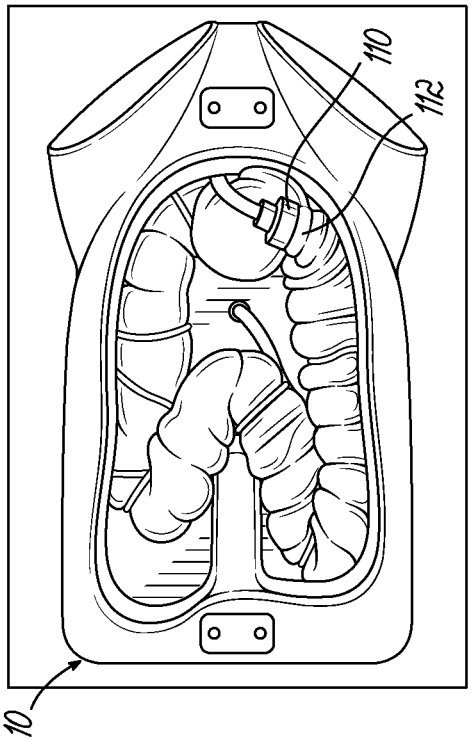
FIG. 12B  t=35 sec
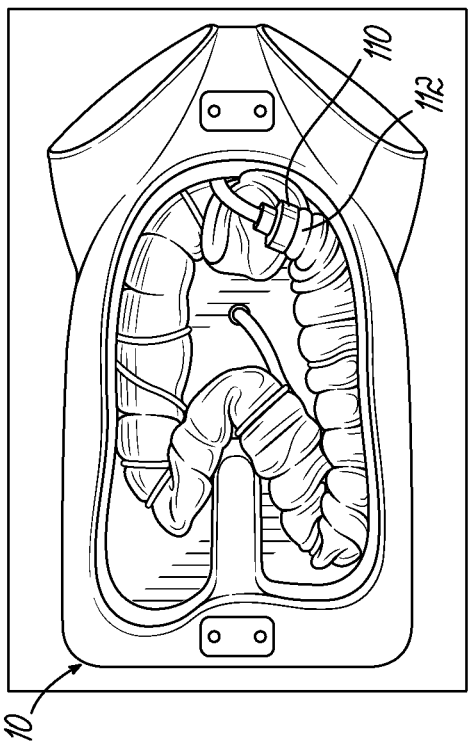
FIG. 12A  t=0 sec

ACTIVE COLONOSCOPY TRAINING MODEL AND METHOD OF USING THE SAME

FIELD OF THE INVENTION

The present invention relates generally to systems and methods for performing a colonoscopy and, more specifically, to systems and methods for colonoscopy training.

BACKGROUND

Colorectal cancer, also known as colon cancer, is a type of cancer in which there is cancerous growth in the colon, rectum, or appendix. It is the fourth most commonly observed form of cancer. Approximately 70% to 80% of colorectal cancer occurs among people at average risk, which is defined as any individual who is not categorized as being at high risk. Consequently, it is always suggested to undergo a total colonoscopy once every ten years for all people above fifty years of age.

Colonoscopy—an endoscopic examination of the colon and a portion of the small intestine—is an important medical procedure in diagnosing colorectal disorders. Medical professionals need to have sufficient training to gain expertise. In the United States, the American Society for Gastrointestinal Endoscopy (ASGE) suggests a minimum of 100 colonoscopies be performed by medical students to acquire proficiency, and it is considered that most students require more than this number. When medical students are trained, this training is usually associated with long procedure times causing discomfort to each patient and further complicating the procedure.

In the last twenty years, a number of simulators have been developed to aid in training students by practicing the procedure in a controlled and safe environment. Due to constraints in educational funds, time, patient availability, and an increasing patient awareness in the medical field, large scale use of simulators is necessary in training and educating medical students. It is predicted that with further technological advancements, practice on simulators will become a requisite before actual practice.

Conventional colonoscopy training models may be categorized as visual part based on virtual reality, visual part with a feedback mechanism, and ex vivo simulator including a portion of animal or mechanical model. The ex vivo simulator may include a bovine colon with a hard cover surrounding and confining the ex vivo bovine colon. However, the hard cover reduces visual feedback that the trainee may otherwise acquire reaching specific landmarks within the bovine colon. The main function of the ex vivo model is to improve intubation skill and multiple parameter control.

Conventional virtual reality-based colonoscopy simulators include one or more graphics displayed on the screen to enhance the effect of the colonoscopy training. One such model, the GI Mentor (Simbionix, Lod, Israel), includes a flexible endoscopy simulator used with a kind of virtual reality simulator that is suitable for employing various scenarios. Still another virtual reality simulator is the GI Mentor II computer system. However, the GI Mentor series is very expensive and not all the test assessments are satisfied by the users.

While virtual reality simulation may be used to improve the trainee's skill and performance, virtual reality may also be used to enhance the current training quality and improve patient safety.

However, computer simulation alone is not helpful in enhancing the training effect. Therefore, some colonoscopy simulators incorporate electrical motors with encoders to generate tactile feedback effects that parallel the displays on the screen. Realistic feedback to the shaft of the colonoscope is one of the keys to validating the learning curve of, for example, the commercially-available HT Immersion Medical Colonoscopy Simulator (Immersion Medical, Inc., San Jose, Calif.).

Most conventional colonoscopy simulators measure partial outcomes, such as intubation skills including, for example, the ability to reach the cecum or to escape a loop problem (which is when the distal tip end of the colonoscope turns and advances out of the colon rather than further advancing within the colon) or differentiation of skill level (i.e., novice/intermediate/expert). However, there remains a need for a simulator and/or training system that provides comprehensive feedback in a realistic surgical environment.

BRIEF DESCRIPTION OF THE FIGURES

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 9A-9J are graphs illustrating a detected force for each of ten load sensors as a function of time and in accordance with one embodiment of the present invention.

FIG. 12A shows an initial sequence for introducing a gas into the colorectal tube of FIG. 2 for increasing a colonic pressure within the colorectal tube in accordance with one embodiment of the present invention.

FIG. 12B is a final sequence for introducing the gas into the colorectal tube of FIG. 2 for increasing a colonic pressure within the colorectal tube in accordance with one embodiment of the present invention.

DETAILED DESCRIPTION

Figure 1A:
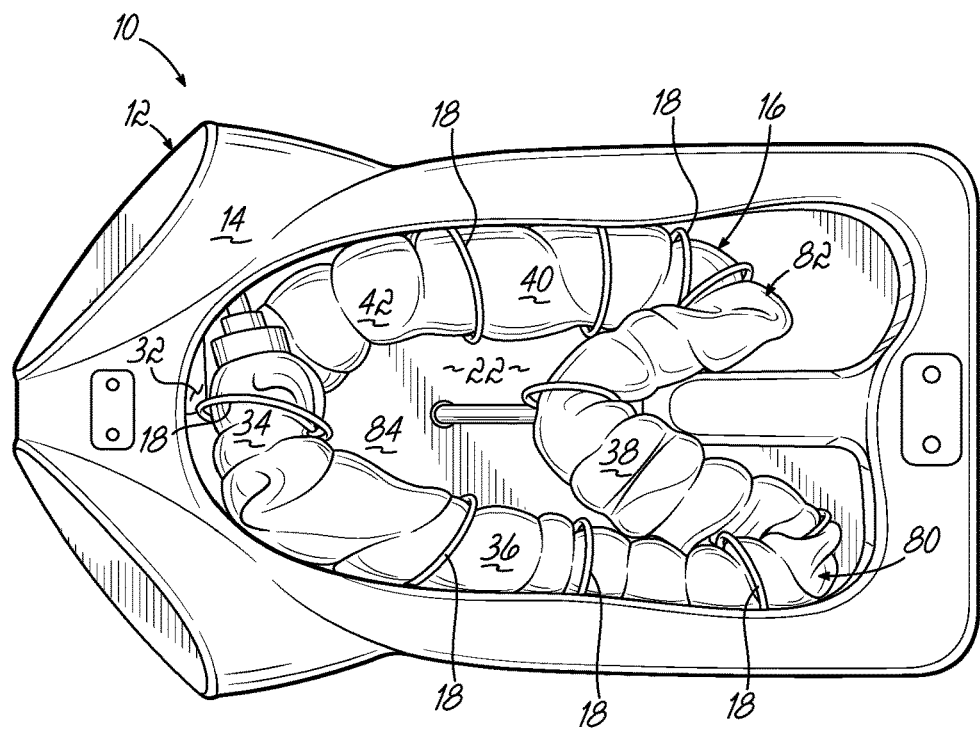
FIGS. 1A and 1B are front and rear portions, respectively, of an active colonoscopy training model in accordance with one embodiment of the present invention.

Turning now to the figures, and in particular to FIG. 1, an active colonoscopy training model (ACTM) 10 is shown in accordance with one embodiment of the present invention. The ACTM 10 may include an abdominal model 12, such as the Colonoscope Training Model, which is commercially-available from KYOTO KANAKU CO., LTD. Generally, the abdominal model 12 may include a molded outer body 14, a colorectal tube 16, a plurality of tube fixtures 18, an anus unit (not shown), and an air bulb (not shown) for use with the anus unit (not shown). The outer body 14 may be constructed from a semi-rigid resin or plastic and includes a hollow cavity 22 and a first opening (not shown) at approximately the anatomical position of the anus for providing access to the hollow cavity 22. The anus unit (not shown) with the air bulb is positioned at the first opening and is configured to be inflated so as to simulate resistance similar to the anus sphincter. The anus unit (not shown) may be coupled to the outer body 14 by one or more bolts or other similar securement devices.

The colorectal tube 16 may be constructed from a semi-compliant polymeric material and includes a plurality of folds to simulate the structure of the human colon. Also, like the anatomy of the human colon, the colorectal tube 16 may be divided into a rectum 32, a sigmoid colon 34, a descending colon 36, a transverse colon 38, an ascending colon 40, and a cecum 42. Each portion of the colorectal tube 16 may be shaped and sized, with an anatomically correct number of folds, to properly replicate the human colon.

Figure 2:
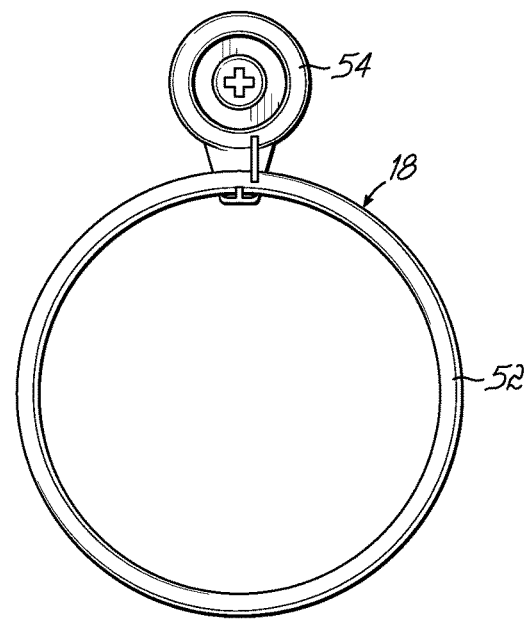
FIG. 2 is a fixture suitable for securing a colorectal tube in an abdominal model of the active colonoscopy training model of FIG. 1A.
Figure 3:
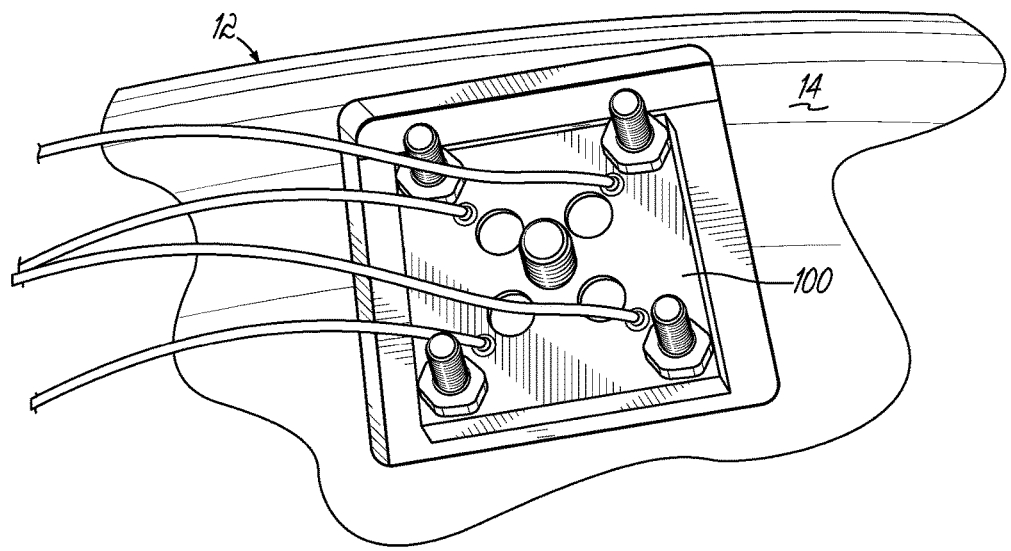
FIG. 3 is a load cell connected to the colorectal tube of FIG. 1A in accordance with one embodiment of the present invention.
Figure 4:
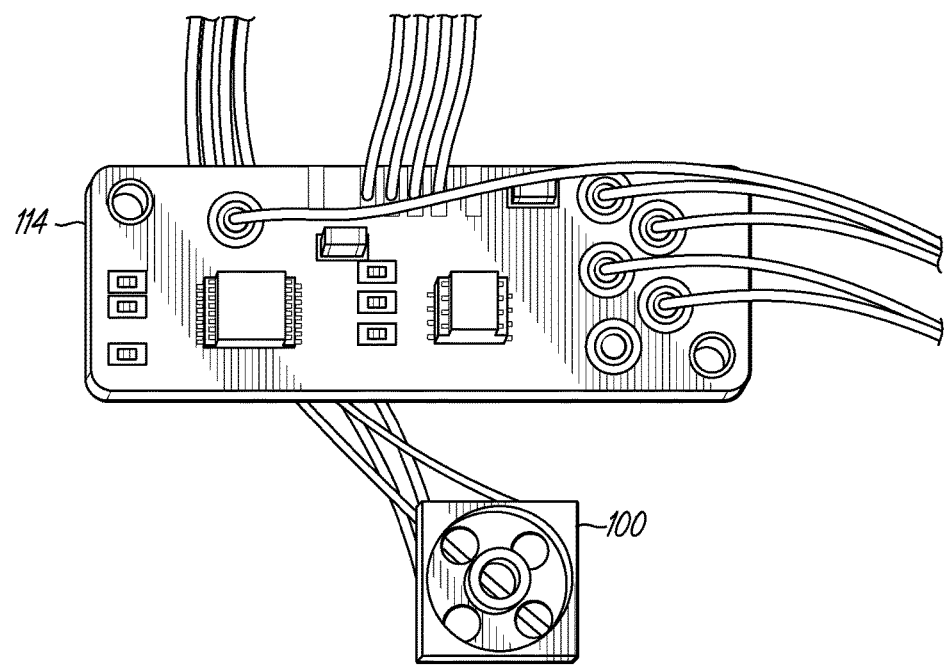
FIG. 4 is the load cell of FIG. 3 with a load cell driver in accordance with one embodiment of the present invention.
Figure 5:
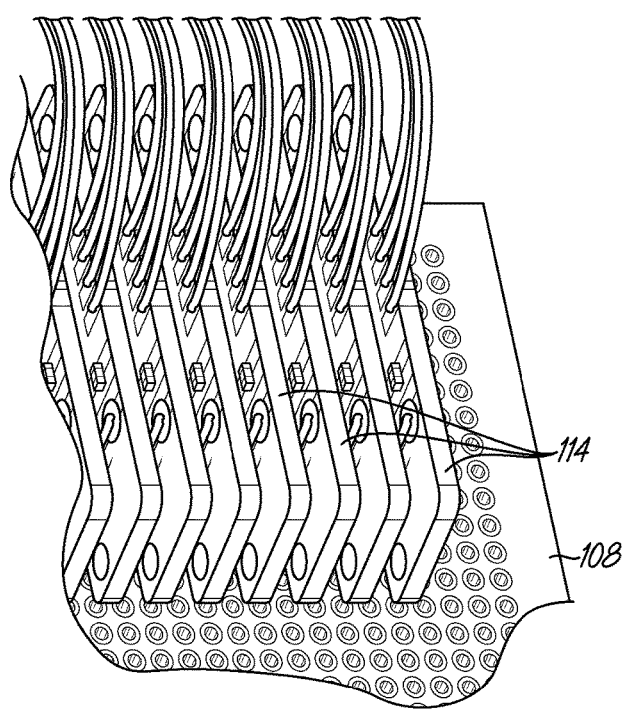
FIG. 5 is a plurality of load cell drivers coupled to a data acquisition system.

The rectum 32 is coupled to the anus unit (not shown), and the colorectal tube 16 is arranged and secured within the cavity 22 by the plurality of the fixtures 18. As is shown in FIG. 2, each fixture 18 may include a ring portion 52 configured to surround the colorectal tube 16 and a base portion 54 to secure the ring portion 52 to the outer body 14 (see FIG. 1A). In some embodiments, the fixtures 18 may further include a tensioner (not shown), such as a spring, for biasing the colorectal tube 16 in a particular direction. While any number of fixtures 18 may be used, generally ten fixtures 18 are sufficient and are distributed from the rectum 32 to the cecum 42.

Figure 1B:
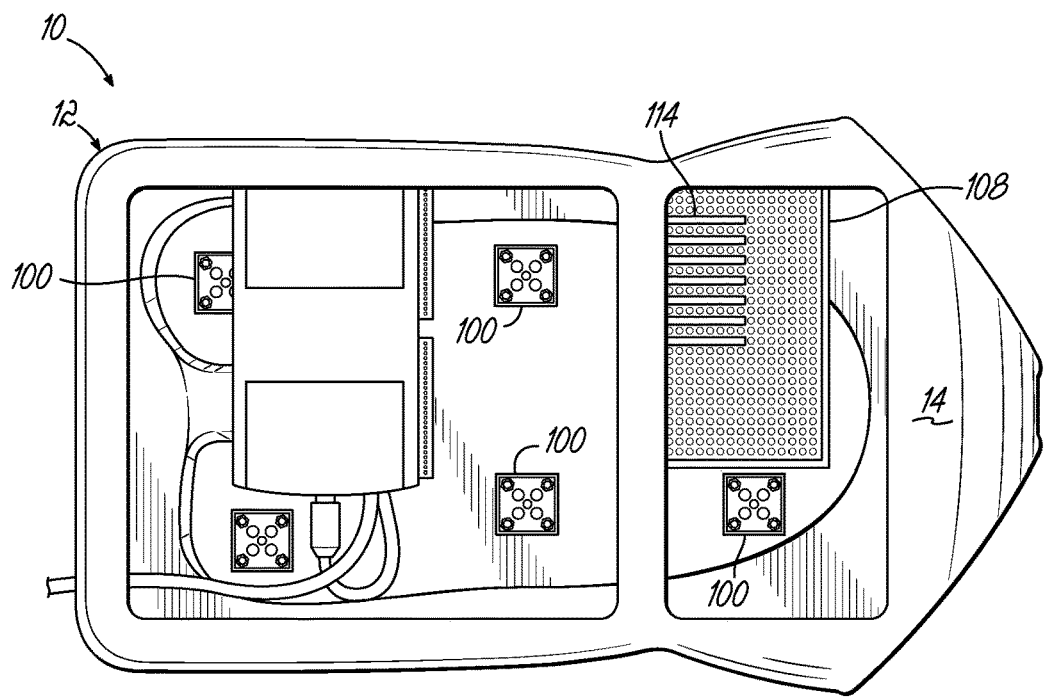
Figure 1C:
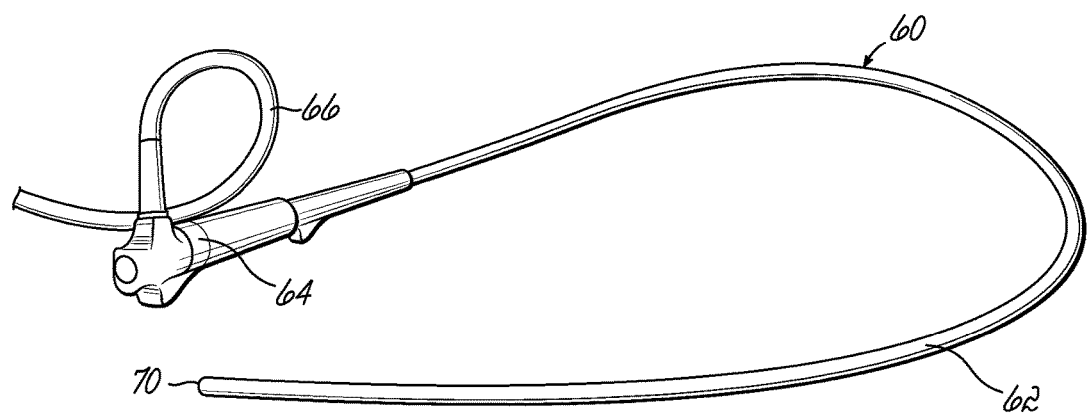
FIG. 1C is a colonoscope suitable for performing a colonoscopy training session with the active colonoscopy training model of FIG. 1A in accordance with one embodiment of the present invention.

A user, i.e., a colonoscopist, may use a colonoscope 60 as shown in FIG. 1C to perform a colonoscopy training session using the ACTM 10. The colonoscope 60 may be any endoscopic instrument suitable for examination of the human colon. The colonoscope 60 includes a colonoscope shaft 62; a camera (not shown) on the distal end 70; a light source (not shown) on the distal end 70; a control head 64 providing one or more knobs for controlling the light, the camera, suction, water feed, air feed, and so forth; and an umbilical cable 66 extending to a computer 68 (FIG. 7), a power source (not shown), and so forth. The colonoscope shaft 62 may be constructed with a rubber cover surrounding stainless steel braces and defining one or more lumens therein for supplying water, air, vacuum, and/or a pathway for the control (for example, fiber optical wires) of the light and/or camera. The stainless steel braces provide sufficient structure so that the colonoscope 60 may be directed into the colorectal tube 16 through the anus unit (not shown) and the rectum 32.

In medical practice and with respect to FIGS. 1A-1C, and while the colonoscope 60 is positioned within the human colon, there are generally two different types of forces applied by the colonoscope 60. These forces include: (1) a quasi-static force and (2) a dynamic force. The quasi-static force is mainly due to the stiffness of the colonoscope shaft 62 and may be exerted without advancing or retracting the colonoscope 60. Thus, the colonoscope 60 may exert a quasi-static force onto an inner wall of the colon any time the colonoscope shaft 62 has a radius of curvature that is significantly different (larger or smaller) from the radius of curvature of a portion of the colon. Normally, the smallest radius of curvature of the colon is located within the sigmoid colon 34 (except for splenic and hepatic flexures 80, 82), more specifically, where the sigmoid mesocolon (not shown) attaches the sigmoid colon 34 to the dorsal pelvic wall 84. Here, the sigmoid colon 34 is generally shaped to include a "U" or "V" shaped curve; however, the radius of curvature of the colonoscope shaft 62 may be much larger due to the shaft stiffness. This difference in the radius of curvature creates a localized tension, or force, on the inner wall of the sigmoid colon 34. As applied herein, quasi-static forces are negligible as compared to the dynamic forces.

The dynamic forces are considered to be the main source of trauma to the colon, particularly if looping should occur. During an actual colonoscopy procedure, the colonoscopist may feel a laterally-directed force while steering the distal end 70 of the colonoscope shaft 62 within, or proximate to, the cecum 42. Such steering may occur when the distal end 70 is rotated to achieve 180 degrees of view. While there is the possibility of mechanical trauma by this laterally-directed force, the more significant risk is due to an axially-directed force. The axially-directed forces may occur when the colonoscopist pushes the shaft 62 of the colonoscope 60 so as to advance the distal end 70 within the colon, which may result in perforation of the colon.

With respect to FIGS. 1A-1C and FIGS. 3-4, To quantify the applied forces, and in accordance with one embodiment of the invention, a plurality of load cells 100 may be operably coupled to the colorectal tube 16 and as is shown in FIGS. 1B and 3-5. Each load cell 100 is configured to measure a magnitude of localized tension applied to the walls of the colorectal tube 16, which may then be correlated to an amount of force applied by the colonoscope shaft 62. More specifically, at least one load cell 100 may be attached to the outer body 14 and at an interface between each fixture 18 and the colorectal tube 16. The load cells 100 may differ in range and/or sensitivity of force measurements. For example, the lower portions of the colorectal tube 16, which generally experience greater applied-forces, may include load cells 100 that are configured to measure larger magnitudes of tension, such as up to about 10 N. The load cells 100 positioned proximal to the transverse and ascending colons 38, 40 may be configured to measure a smaller magnitude of tension, such as up to about 2.5 N. Additional load cells 100, having other measureable ranges, may also be used, including, for example, spring loaded load cells 100 configured to measure up to about 1 N, which may be positioned proximate to the sigmoid and transverse colons 34, 38.

As was noted above, the conventional colonoscope 60 generally includes the distally-positioned light source. While the light source enables visualization of the interior portions of the colon during a colonoscopy procedure, the light source may also be used to track the distal end 70 of the colonoscope shaft 62, as used with the ACTM 10 and during a colonoscopy training session.

With reference now to FIGS. 1A, 1C, 6A, and 6B, and in accordance with one embodiment of the present invention, the light source of the distal end 70 of the colonoscope shaft 62 and thus the location of the distal end 70 itself may be determined using a plurality of photocells 104 within the colorectal tube 16. In one particular embodiment, the photocells 104 may be cadmium sulfide (CdS) photoconductive cells, such as those that are commercially-available from Advanced Photonix, Inc. (Ann Arbor, Mich.). Each photocell 104 may be connected to a sensor driver board 106 having potentiometers, resistors, and operational amplifiers, as necessary or desired. Adjustments made at the potentiometer may be used to control the sensitivity of the photocells 104 to different light intensities. The sensor driver board 106 may be interfaced with a digital port of a data acquisition system 108, which may further be connected to the computer 68 (see FIG. 7), for example, via a USB port. While any number of photocells 104 may be used, twenty-four sensor driver boards 106, corresponding to twenty-four photocells 104, are shown. The twenty-four photocells 104 may be arranged such that eight photocells 104 (P1-P8) are connected to Port 1 of the data acquisition system 108, eight photocells 104 (P9-P16) are connected to Port 0 of the data acquisition system 108, and eight photocells 104 (P17-P24) are connected to Port 2 of the data acquisition system 108.

The position of the distal end 70 of the colonoscope shaft 62 within the colorectal tube 16 may be determined by distinguishing activated ones of the plurality of photocells 104. For example, if during a colonoscopy training session the first photocell 104 (P1), being positioned at the rectum 32, with or without one or more of the other photocells 104 (P2-P24), is activated, then the data acquisition system 108, with the computer 68 (see FIG. 7), may be used to determine that the distal end 70 of the colonoscope shaft 62 is positioned at the anus unit (not shown) and is positioned to enter the rectum 32. Sequentially, then, when the first photocell 104 (P1) is deactivated and the second photocell 104 (P2), being positioned at the sigmoid colon 34, with or without one or more of the other photocells 104 (P3-P24), is activated, then the distal end 70 of the colonoscope shaft 62 has advanced into the rectum 32. Continued advancement of the distal end 70 through the colorectal tube 16 is detected by the sequential deactivation of successive ones of the photocells 104. Conversely, retraction of the distal end 70 is detected by the sequential activation of a previous one of the plurality of photocells 104. Accordingly, the sequential responses of the photocells 104 correspond to a unique location of the distal end 70 within the colorectal tube 16. Thus, more specific localization of the distal end 70 may be accomplished by incorporating a larger number of photocells 104 within the colorectal tube 16.

Because of the folds associated with the human colon, as replicated in the colorectal tube 16, light from the distal end 70 of the colonoscope 60 will rarely, if ever, be directly incident onto more than one or two photocells 104. In that regard, localization of the distal end 70 may comprise a binary system in which the detection of light, irrespective of intensity, is considered to be an activation that is indicated by a "1" signal. Likewise, the lack of detection of light is considered to be deactivation and is indicated by a "0" signal. Thus, and to minimize noise, unused ports, i.e., ports associated with inactive ones of the photocells 104 (i.e., those generating a 0 signal) may be automatically filtered and/or turned off when no light is incident onto those photocells 104.

Turning now to FIG. 1A and FIGS. 12A-12B, and in accordance with another embodiment of the present invention, the ACTM 10 may be configured to monitor the interstitial pressure within the colorectal tube 16 during a colonoscopy training session. Conventionally, colonic pressure has been measured using manometric catheters, including, for example, solid-state manometric catheters and water infusion manometric catheters. Solid-state manometric catheters use a pressure transducer to determine pressure while water infusion manometric catheters use a balloon-tipped catheter that is perfused with water.

More specifically, a pressure transducer 110 may be installed at the small intestine end 112 of the cecum 42. To replicate the limited motion that is typical of the cecum 42, the pressure transducer 110 may also be coupled to the dorsal pelvic wall 84, such as by a 15 cm flexible rubber tube (not shown). The pressure transducer 110 may be calibrated with a known air pressure and validated for a range of pressures within the ACTM 10. The pressure transducer 110 may be operable to measure and record the pressure within the colorectal tube 16 in real-time and during the colonoscopy training session.

Figure 6A:
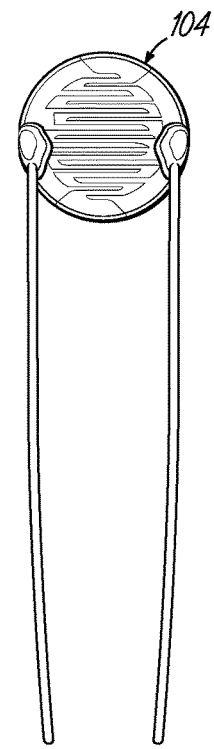
FIGS. 6A and 6B are a photocell and a plurality of photocell drivers, respectively, in accordance with one embodiment of the present invention.
Figure 6B:
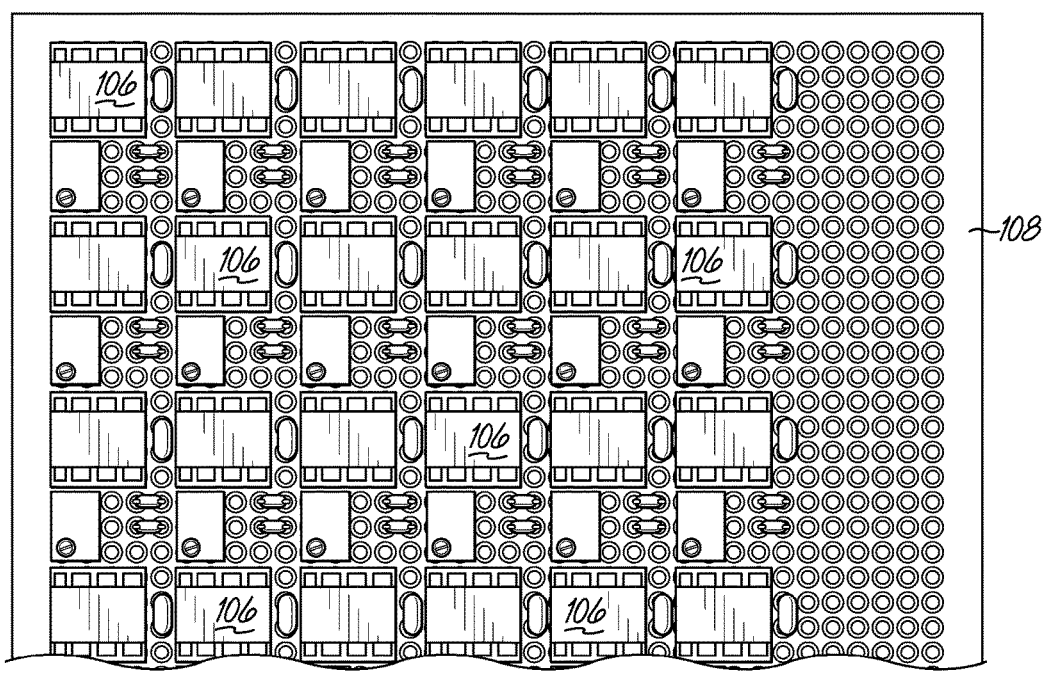

The pressure transducer 110, along with each load cell 100 and the photocells 104, may be coupled to the data acquisition system 108 shown in FIG. 6B. For example, the data acquisition system 108 may be coupled to the load cells 100 via one or more load cell drivers 114, the pressure transducer 110 via one or more analog-to-digital converters (ADC), the photocells 104 via sensor driver boards 106, and so forth. The data acquisition system 108 may then be connected to a computer 68 (see FIG. 7) via, for example, a USB port, to transfer all the information from the sensors, such as the load cells 100, the photocells 104, and the pressure transducer 110, to the computer 68. For example, ADCs may be used to monitor the forces measured by the load cells 100 and the pressure measured by the pressure transducer 110 while digital input ports may be used to monitor the digital signal outputs from the plurality of photocells 104. The data acquisition system 108 may be powered by a USB connector with, for example, 6 and 12 volts applied, for powering the load cell drivers 114, the sensor driver boards 106, and activation of the pressure transducer 110. Analog and digital powers may be filtered and separated for the clarity of the power sources.

Figure 7:
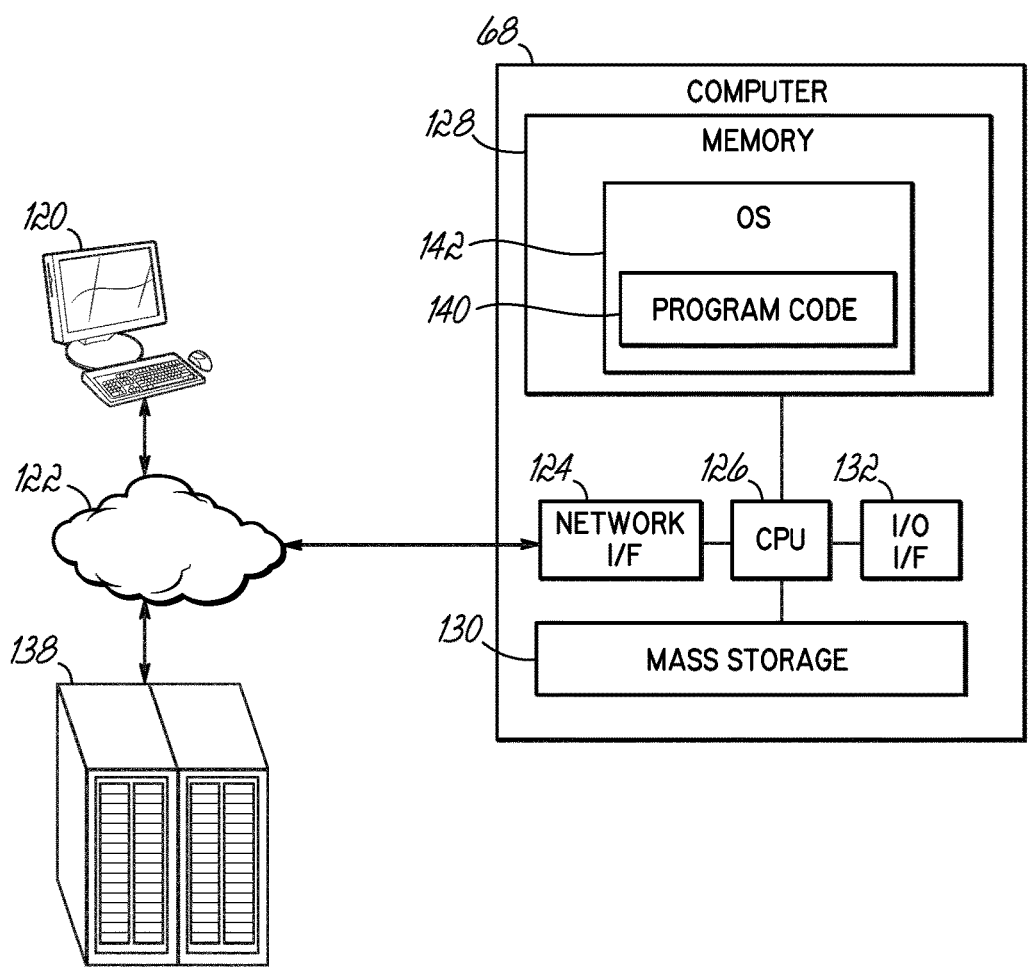
FIG. 7 is a schematic illustration of a computer for use with the active colonoscopy training model of FIG. 1 and in accordance with one embodiment of the present invention.

Turning now to FIGS. 6B and 7, the details of the computer 68 for operating the data acquisition system 108, receiving information from the data acquisition system 108, and/or displaying or analyzing the acquired information, is described in greater detail. The computer 68 that is shown in FIG. 7 may be considered to represent any type of computer, computer system, computing system, server, disk array, or programmable device such as multi-user computers, single-user computers, handheld devices, networked devices, or embedded devices, etc. The computer 68 may be implemented with one or more networked computers 120 using one or more networks 122, e.g., in a cluster or other distributed computing system through a network interface (illustrated as NETWORK I/F) 124. The computer 68 will be referred to as "computer" for brevity's sake, although it should be appreciated that the term "computing system" may also include other suitable programmable electronic devices consistent with embodiments of the present invention.

The computer 68 typically includes at least one processing unit (illustrated as CPU 126) coupled to a memory 128 along with several different types of peripheral devices, e.g., a mass storage device 130 with one or more databases, an input/output interface (illustrated as I/O I/F 132), and the Network I/F 124.

In particular, the CPU 126 may receive data from the colonoscopist through at least one interface (e.g., a keyboard, a mouse, a microphone, and/or other user interface) and/or outputs data to the colonoscopist through at least one output device (including, for example, a display, speakers, a printer, and/or another output device). Moreover, in some embodiments, the I/O I/F 132 is communicated with a device that is operative as a user interface and an output device in combination, such as a touch screen display.

The memory 128 may include a dynamic random access memory (DRAM), static random access memory (SRAM), a non-volatile random access memory (NVRAM), a persistent memory, a flash memory, at least one hard disk drive, and/or another digital storage medium. The mass storage device 130 is typically at least one hard disk drive and may be located externally to the computer 68, such as in a separate enclosure or in one or more networked computers 120, one or more networked storage devices 138 (including, for example, a tape or optical drive), and/or one or more other networked devices (not shown, but including, for example, a server).

The CPU 126 may be, in various embodiments, a single-thread, a multi-threaded, a multi-core, and/or a multi-element processing unit (not shown) as is well known in the art. In alternative embodiments, the computer 68 may include a plurality of processing units that may include single-thread processing units, multi-threaded processing units, multi-core processing units, multi-element processing units, and/or combinations thereof, as is well known in the art.

Similarly, the memory 128 may include one or more levels of data, instruction, and/or combination caches, with caches serving the individual processing unit or multiple processing units (not shown), as is well known in the art. The memory 128 of the computer 68 may include one or more applications (illustrated as Program Code 140), or other software program, which are configured to execute in combination with an Operating System (illustrated as OS 142) and automatically perform tasks necessary for use of the ACTM 10, with or without accessing further information or data from one or more database(s) of the mass storage device 130.

Those skilled in the art will recognize that the environment illustrated in FIG. 7 is not intended to limit the present invention. Indeed, those skilled in the art will recognize that other alternative hardware and/or software environments may be used without departing from the scope of the present invention.

Figure 8:
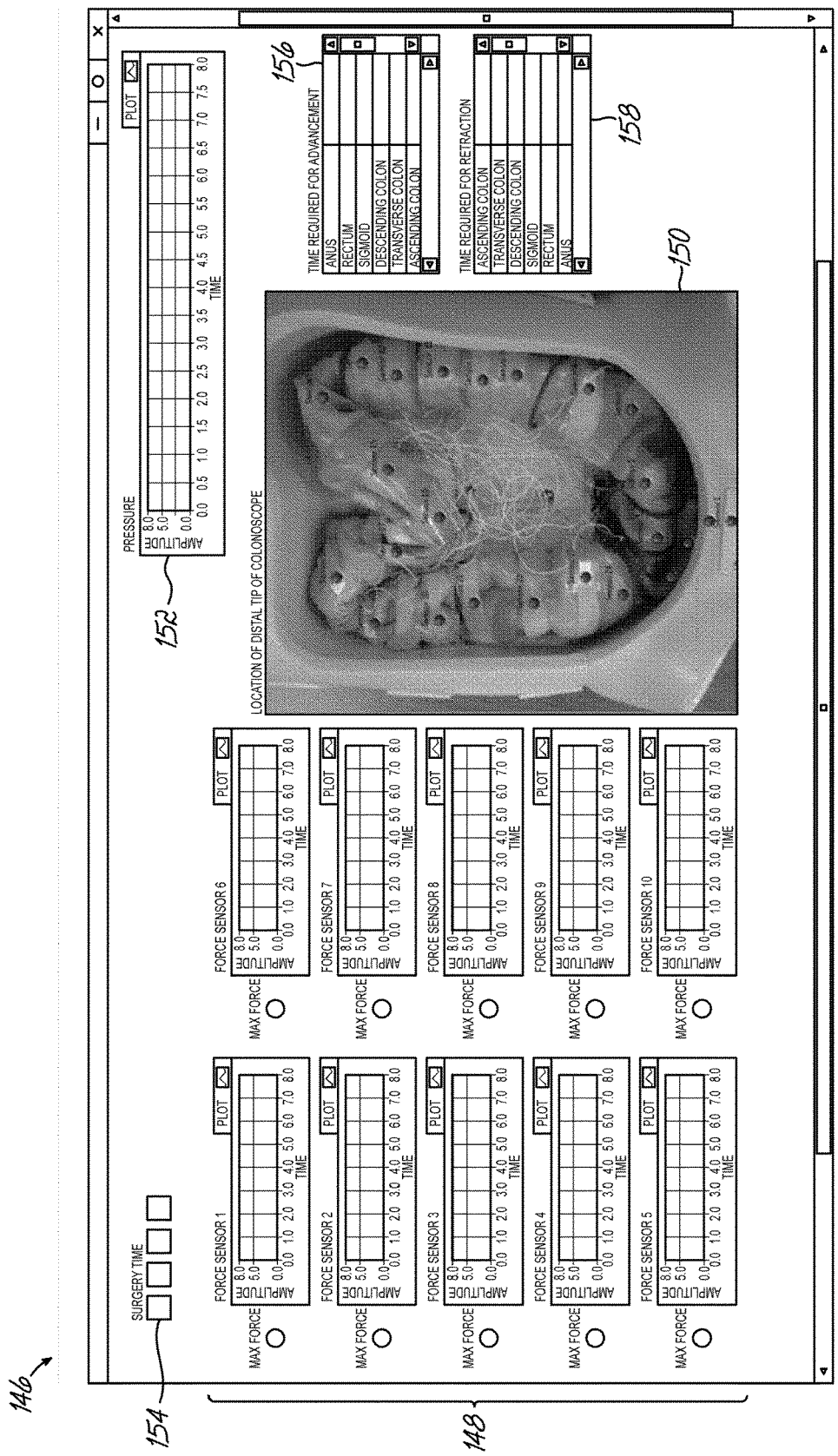
FIG. 8 is an exemplary graphical user interface of the computer of FIG. 7 and in accordance with one embodiment of the present invention.
Figure 9F:
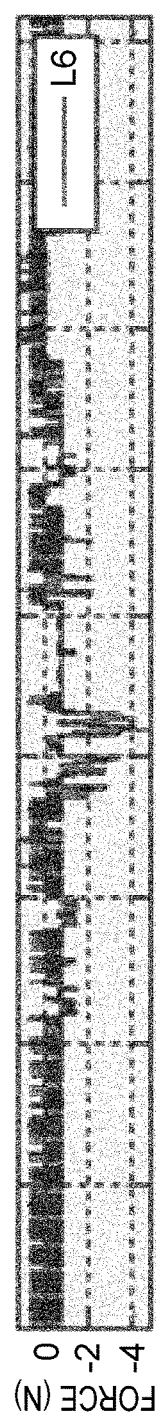
Figure 9G:
Figure 9H:
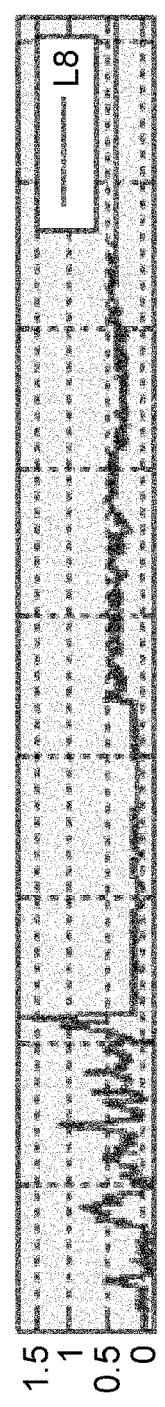
Figure 9I:
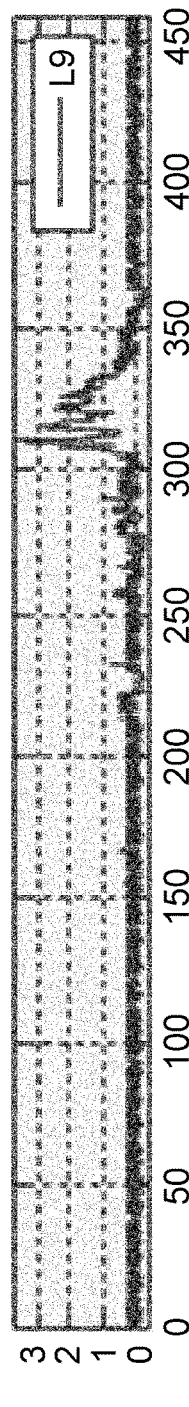
Figure 9J:
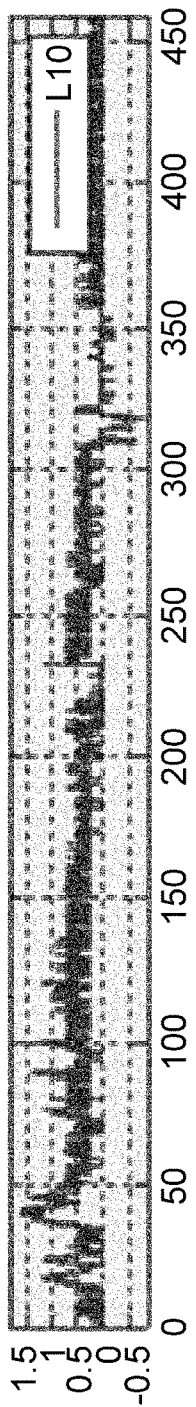
Figure 10:
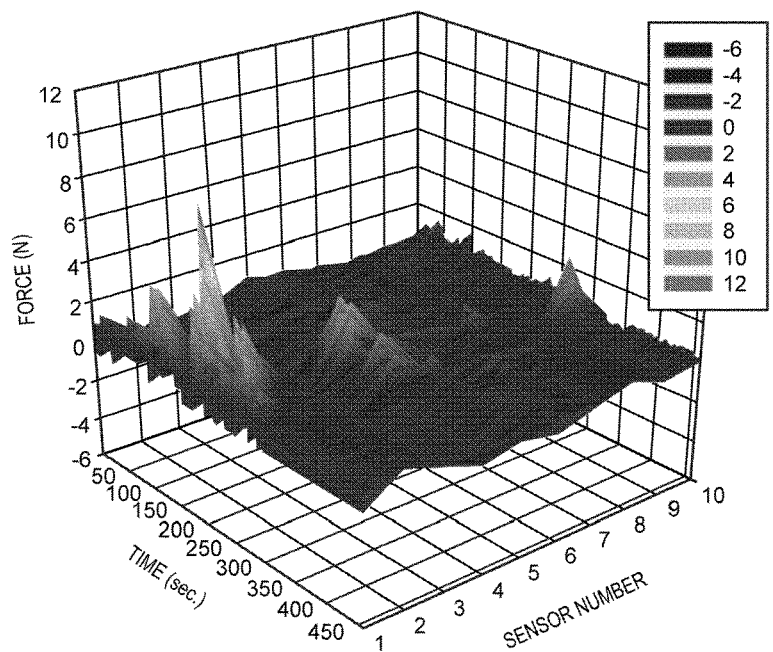
FIG. 10 is a three-dimensional graph of a surface plot of the detected forces of FIGS. 9A-9J as a function of time.

FIG. 8 illustrates one exemplary graphic user interface (GUI) 146, which may be used to displace, in real-time, information during the colonoscopy training session and/or to summarize the performance of the colonoscopist during a previously performed colonoscopy training session. The GUI 146 may be implemented using LabView software (National Instruments, Corp., Austin, Tex.). As shown, the GUI 146 may display a force readout 148 for each load cell 100 (see FIG. 3), provide a visual display 150, a pressure readout 152 via the pressure transducer 110 (see FIG. 12A), a total surgical time 154, a time-to-advance estimation 156, and a time-to-retract estimation 158. The data may be automatically saved so that the colonoscopist may review a performance summary after the training session.

The following non-limiting examples illustrate some results of the use of the various embodiments of the present invention for particular applications.

Example 1: Force Measurements

FIGS. 9A-9J and 10 illustrate the readouts of the forces measured during a complete colonoscopy training session with the ACTM 10 of FIGS. 1A-1B and the colonoscope 60 of FIG. 1C. Ten load cells 100 were arranged such that load cells L1, L2, and L3 were positioned along the sigmoid colon 34; load cells L4, L5, and L6 were positioned along the descending colon 36; load cell L7 was positioned at the splenic flexure 80; load cell L8 was positioned in the middle of the transverse colon 38; load cell L9 was positioned at the hepatic flexure 82; and load cell L10 was positioned in the middle of the ascending colon 40. During the colonoscopy training session, the colonoscopist performed a normal colonoscopy procedure and examined the inside of the colorectal tube 16 (even though the mucosa did not display any bowel diseases).

Table 1, below, shows the mean and maximum force detected by each load cell 100. For example, L1 detected the largest maximum over-all force, L4 detected the second largest force, and L9 detected the third largest force. Most of the largest forces were detected within the sigmoid colon 34, the descending colon 36, and the ascending colon 40 when the distal end 70 was advanced. It is during these time periods of large force detection that mechanical trauma is more likely to occur.

L1 showed peak forces during the time period ranging from 100 seconds (1.6 min) to 250 seconds (4.2 min) with a maximum force of about 9.55 N, which occurred when the distal end 70 was located within the ascending colon 40. During this same time period, L4 and L9 exhibited moderate force values, and L3, L4, L5, L6, L7, and L10 showed negative forces (i.e., compression). Because the molded body was positioned on its side, which is conventional protocol for a colonoscopy, the weight of the applied-lubrication fluid and the colorectal tube 16 were compensated for the zero value.

After the distal end 70 of the colonoscope 60 passed the hepatic flexure 82, the colonoscopist had to apply more force to further advance the distal end 70 forward; however, the colonoscopist encountered a looping problem. Accordingly, it was necessary to open the cover to the ACTM 10 and press on the colonoscope shaft 62 to overcome the looping.

The greatest mean value of detected force over the total surgical time period was about 0.85 N, as measured by sensor 1.

The second largest force was detected by L1 and occurred when the colonoscopist passed the splenic flexure 80. Because the lumen of the splenic flexure 80 was closed, the colonoscopist had difficulty in opening the lumen and passing the splenic flexure 80. The third largest force was detected by L4 when the distal end 70 passed the ascending colon 40.

Except for L1, the mean values of all detected forces were less than about 0.34 N.

The mean value of the detected forces may be indicative of fatigue on the mucosa. Load cells L2, L5, L6, L7, L8, and L10 showed the medium value of the maximum detected forces and L3 showed the lowest value of the maximum detected forces. L3 did not detect much force, with the largest force detected by L3 being about 0.031 N. Negative mean values are due to the offset of the colon weight and lubrication.

Because the rectum 32 is fixed at the anus unit (not shown), no significant force exerted at the rectum 32 was detected. The sigmoid colon 34 incurred 63.3% of the total average forces during the colonoscopy training session.

When the distal end 70 passed the sigmoid colon 34, only the ascending colon 40 was affected due to the constraints of the configuration. When the distal end 70 was within the descending colon 36, the sigmoid colon 34 incurred forces due to the advancing movement of the colonoscope shaft 62, and the load cells 100 of the transverse colon 38 detected the peak force value. The hepatic flexure 82 showed some stress right after the distal end 70 entered into the ascending colon 40. The distal end 70 passed the transverse colon 38 without exerting forces to any portion of the colon except for the beginning of the sigmoid colon 34. The maximum forces were found at the sigmoid colon 34 (L1, L2, and L3), the descending colon 36 (L4 and L6), the hepatic flexure 82 (L7), and the splenic flexure 80 (L9) as the distal end 70 passed the splenic flexure 80 and entered into the ascending colon 40.

No forces were exerted at the cecum 42 because the colonoscopist did not manipulate the dial knobs to evaluate the ileo-cecal valve or for any bowel diseases.

The retraction procedure did not stress any portion of the colon. Normally, retraction should take several minutes to check for any missed bowel diseases; however, because most trauma occurs during the advancement of the colonoscope, retraction of the colonoscope was quickly performed and without observing any bowel diseases.

TABLE 1

| Load Cell Number | Mean Force Applied (N) | Maximum Force Applied (N) |
| --- | --- | --- |
| 1 | 0.850 | 9.549 |
| 2 | 0.334 | 2.202 |
| 3 | −0.039 | 0.031 |
| 4 | 0.091 | 3.839 |
| 5 | −0.029 | 1.629 |
| 6 | −0.282 | 1.353 |
| 7 | 0.162 | 1.954 |
| 8 | 0.271 | 1.775 |
| 9 | 0.146 | 3.784 |
| 10 | 0.304 | 1.835 |

Example 2: Localization of the Distal End

Figure 11:
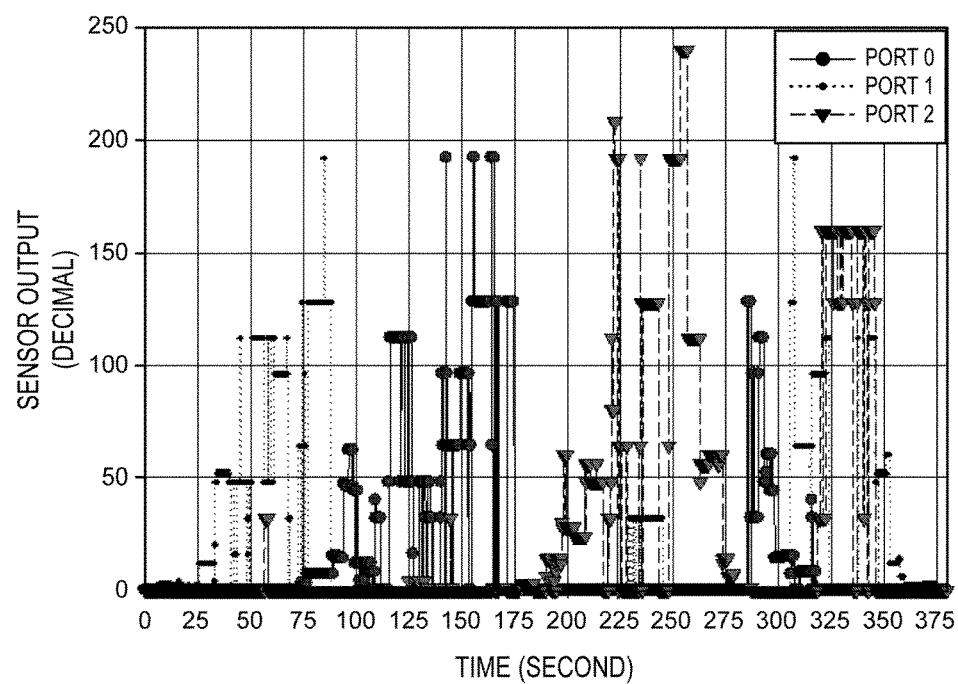
FIG. 11 is a graph illustrating photocell response to light in localizing a colonoscope in accordance with one embodiment of the present invention.

FIG. 11 illustrates the readouts of the photocells 104 of FIGS. 6A-6B during a complete colonoscopy training session with the ACTM of FIG. 1A and colonoscope 60 of FIG. 1C. Twenty-four photocells 104 were used with eight photocells 104 connected to each of Port 1, Port 2, and Port 0. The voltage data acquired by the data acquisition system 108, which were digital decimal values, were converted to 8 bit binary numbers and plotted against corresponding time in seconds and as shown in FIG. 11. The same information is presented quantitatively, below, in Table 2.

The detected voltage values at Port 1, to which P1-P8 are connected, indicate that the colonoscope 60 required about 75 sec to pass through the rectum 32 and the sigmoid colon 34. It should also be noted that Port 0, to which P9-P16 are connected, did not detect a voltage value until about 116 sec (1.9 min) into the procedure, which indicates that the distal end 70 of the colonoscope shaft 62 passed from the descending colon 36 to the transverse colon 38 in about 116 sec.

The voltage value detected by P17-P24, associated with Port 2, indicated that the distal end 70 required about 49 sec to pass through the right hepatic flexure 82 and into the ascending colon 40.

During retraction, Port 2 voltage values were detected during the surgical time period ranging from about 4 min 7 sec (247 sec) to about 4 min 58 sec (298 sec). This was followed by the detection of a voltage value in Port 0 by P9-P16 during the surgical time period ranging from about 4 min 58 sec (198 sec) to about 5 min 48 sec (348 sec). P1-P8 detected voltage values during the surgical time period ranging from about 5 min 48 sec (348 sec) to about 6 min 15 sec (375 sec).

It would be readily appreciated that there is significant noise in some portions of FIG. 11. For instance, Port 2 seems to have detected some voltage values during the time period in which the distal end 70 of the colonoscope 60 was passing from the rectum 32 to the sigmoid colon 34. Because P17-P24 are connected to Port 2 and are positioned on the opposing end of the colon, these values should ideally be zero. It is hypothesized that the detected voltage values in Port 2 may be the result of light from the distal end 70 of the colonoscope 60 within the sigmoid colon 34 being detected by one or more sensors, such as the photocells 104, along the ascending colon 40 (i.e., P17-P24). This incident light activated one or more of P17-P24 and provided some detected voltage values. The effect of noise does not affect the localization of the distal end 70 owing to the algorithm described in the method.

From the results, localization of the distal end 70 was successfully accomplished without introducing extra equipment in the distal end 70 or the body of the colonoscope 60. During the colonoscopy, the colonoscopist did not need to find one or more mock landmarks in vitro artificial colon. The total colonoscopy time and the time to the rectum 32, the sigmoid colon 34, the descending colon 36, the splenic flexure 80, the transverse colon 38, the hepatic flexure 82, the ascending colon 40, and the cecum 42 were successfully tabulated in a real-time basis.

During the procedure, a retraction speed warning was provided to the colonoscopist by the GUI 146 (see FIG. 8) when the retraction speed was too fast, which indicated that the colonoscopist neglected to search for the possible bowel diseases.

TABLE 2

| Location | Advance (seconds) | Retract (seconds) |
| --- | --- | --- |
| Anus/Rectum | 0-46 | 348-375 |
| Sigmoid Colon | 46-75 | 318-348 |
| Descending Colon | 75-117 | 298-318 |
| Transverse Colon | 117-191 | 279-298 |
| Ascending Colon | 191-240 | 247-279 |

Example 3: Pressure Test

FIG. 12A and FIG. 12B illustrate the change in pressure within the ACTM 10 of FIG. 1A with respect to surgical time of a colonoscopy training session. During the colonoscopy training session, air was inserted through a colonoscope air duct until the colorectal tube 16 was fully expanded. After the air pressure reached peak value, the air flow was terminated and the colonic pressure decreased. The pressure measured at the cecum 42 started at about 0 mmHg and increased to 25 mmHg. The pressure was maintained at about 20 mmHg and showed a sudden increase at about 35 sec in the surgical time. While the anus unit (not shown) had been pressurized, some loss of pressure was expected due to the nature of the artificial organ. During a real colonoscopy procedure, some amount of the air inserted to the colon for opening the lumen may be initially lost through the anus, the anus unit (not shown) of the ACTM 10 demonstrated a continuous loss of air.

FIG. 12A and FIG. 12B show the changing shape of the colorectal tube 16 during the colonoscopy training session. As is conventional in colonoscopy procedures, the molded outer body 14 was laid at its side during the colonoscopy training session. Because of the weight of the applied-lubricant and the colorectal tube 16, some lumens within the colon (especially in the sigmoid colon 34, the transverse colon 38, the splenic flexure 80, and the hepatic flexure 82) were initially closed.

It is conventionally thought that the maximum pressure in the cecum 42 of the human colon may reach up to about 120 mmHg. These pressure values are not applicable in the ACTM 10 because of differences in the visco-elastic material characteristics of the colorectal tube 16 and the human colon. For example, the human colon may take more longitudinal stress than transverse stress, and both are greater than the stress receivable by the colorectal tube 16. Furthermore, the rate of expansion rates for the colorectal tube 16 and the human colon are also different. To account for the material characteristic differences, the maximum pressure in the colorectal tube 16 was scaled down from about 120 mmHg to about 25 mmHg. However, about 10 mmHg may be sufficient to open the lumens of the colon without yielding excessive volume change of the colon.

Example 4: Evaluation of the Active Colonoscopy Training Model

Thirty medical students were recruited to perform the procedure on the ACTM 10 with respect to FIGS. 1A-1C, with each student performing the procedure three times. Two practicing surgeons performed the procedure on the ACTM 10 and reached the cecum 42 successfully while 77% (23/30) of the students successfully reached the cecum 42 in all the three trials. Additionally, 13% (4/30) of the students successfully reached the cecum 42 in two trials, but could not reach the cecum 42 in one trial. Finally, 10% (3/30) of the students successfully reached the cecum 42 in one trial, but could not reach the cecum 42 in the other two trials. During this procedure, several results were evaluated. First, an investigation into the differing abilities of practicing surgeons and students was performed. Second, the data was analyzed to compare the force applied to the ACTM 10 during the three trials. Third, the time improvements associated with the trials was compared and evaluated. The following will address each of these analyses in turn.

First, in order to evaluate the equivalency of inexperienced students to expert surgeons, a force data analysis was performed and compared statistically with t-tests shown below in Table 3. The highlighted P-Values in Table 3 are less than 0.05 and signify that the forces collected from the experienced surgeons are significantly different than the students. Specifically, the first trial of the sigmoid colon 34, the descending colon 36, the transverse colon 38, and the third trial of the transverse colon 38 show results which suggest that there is less than a 5% chance that the students apply the same amount of force as the experienced surgeons.

TABLE 3

| Position | Trial | 1 | 2 | 3 |
|---|---|---|---|---|
| | Sigmoid | 0.027 | 0.686 | 0.270 |
| | Descending Colon | 0.021 | 0.517 | 0.235 |

TABLE 3-continued

| Trial | 1 | 2 | 3 |
|---|---|---|---|
| Transverse Colon | 0.028 | 0.061 | 0.006 |
| Ascending Colon | 0.695 | 0.100 | 0.995 |

Secondly, the objective of the force data analysis is to determine whether the force data collected from the experienced surgeons is different than the students. The forces recorded in the rectum 32 were not analyzed and are not shown, because extremely negligible force was recorded in the rectum 32 by the load cell 100. After all, the rectum 32 is generally straight and non-convoluted anatomically; thus, it could be easily traversed with little force. The forces applied by the students in the sigmoid colon 34 (P=0.027), the descending colon 36 (P=0.021), and the transverse colon 38 (P=0.028) during the first trial are significantly different (P<0.05) than the forces applied by the experienced surgeons. As expected, this analysis differentiates the data collected between the students and the surgeons. Based on the data collected using the ACTM 10, inferences can be drawn regarding the expertise level and the competence of the subject performing the procedure. These results indicate that the force applied by all the students decreases with the number of trials. During the first trial, all students exhibited concerns regarding damaging the ACTM 10 through excessive force. For example, the students in the test were a mixture of first and second year medical students. Some of the first year students were originally unaware of indicators for advancing the colonoscope 60. Furthermore, while performing the procedure for the first time, some students were unacquainted with the coordination to manipulate the colonoscope 60 through the ACTM 10. Hence, the student-recorded forces are relatively different with the expert-recorded forces.

Given that the ascending colon 40 is the last part of the colorectal tube 16, only the dynamic forces exerted by the distal end 70 of the colonoscope 60 are experienced. Although the distal end 70 has passed other parts of the colorectal tube 16 at this point in the procedure, the colonoscope 60 exerts static forces that stretch the colorectal tube 16 in these locations. Hence, the student applied forces recorded in the ascending colon 40 during the first trial were similar to the forces applied by the expert surgeons. The force analysis results suggest that the ACTM 10 can be effectively used to introduce a novice student to the performance of the colonoscopy procedure without potential risk to a patient. More particularly, the students can use the ACTM 10 to exercise good practice of intubation, handling the equipment, hand-eye coordination, and various tactics of finding the cecum 42.

The ACTM 10 also produces a realistic endoscopic view on the colonoscopy monitor to further simulate the real-life colonoscopy procedure for training students. Every student had difficulty in moving the colonoscope 60 through the sigmoid colon 34 in each of the three trials. Specifically, the average force recorded in the sigmoid colon 34 during each of the three trials exceeded the average force in any other part of the colorectal tube 16. Due to the anatomy of the human colorectal tube, the colonoscope 60 often loops in the human sigmoid colon. This often causes pain in patients due to the increased average force. Thus, the force applied during a colonoscopy procedure generally depends on the anatomical structure of the human colonoscopic tube, as well as the competence, skill, and experience of the colonoscopist. This validates the close simulation of the real colonoscopy procedure in ACTM 10. These force analysis results indicate that the ACTM 10 will be a productive tool to improve the colonoscopy procedural skills of the novice medical students without risks associated with an actual patient.

Figure 13:
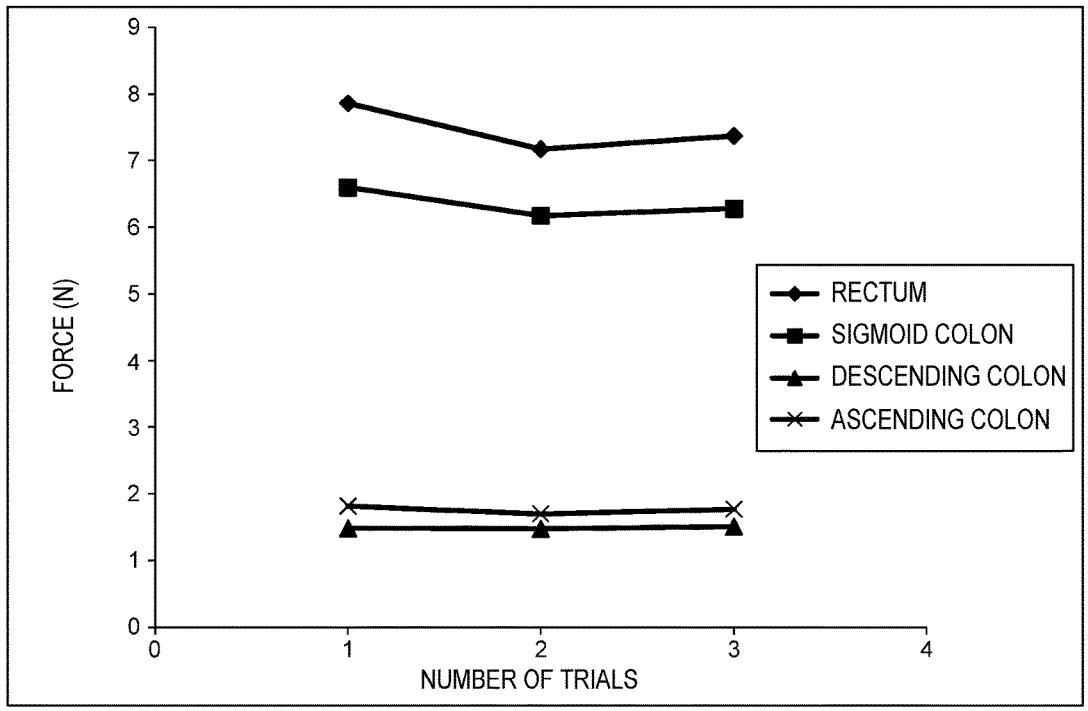
FIG. 13 is a graph of average forces recorded in various positions throughout the active colonoscope training model during three experimental trials.

An analysis of the force data, as shown in FIG. 13, shows the average forces in specific parts of the colorectal tube 16 recorded during each of the three trials using the ACTM 10. The model to test for reduction, or otherwise improvement, in force considered variables of the students, the locations within the colorectal tube 16, and trial number. Each student was anonymously identified with the identifier "St_#" where the "#" is a number unique to each student. A stepwise regression was run with all students and locations as independent binary variables. With entry and exit alphas at 0.05, the model in Table 4 below was generated. The $R^2$ for the model was 83.54%, with the adjusted $R^2$ for the model at 83.20%. Table 4 shows the results generated after running an analysis of the variance (ANOVA) on the force data collected during the three trials.

TABLE 4

| Source | DF | Seq SS | Adj SS | Adj MS | F | P |
|---|---|---|---|---|---|---|
| Regression | 9 | 4778.48 | 4778.48 | 530.94 | 248.15 | 0 |
| Sigmoid | 1 | 2664.77 | 3237.16 | 3237.16 | 1512.98 | 0 |
| Descending Colon | 1 | 1870.53 | 1812.26 | 1812.26 | 847.01 | 0 |
| Transverse Colon | 1 | 61.85 | 139.19 | 139.19 | 65.06 | 0 |
| Ascending Colon | 1 | 99.49 | 99.49 | 99.49 | 46.5 | 0 |
| St_12 | 1 | 28.24 | 32.55 | 32.55 | 15.21 | 0.0001112 |
| St_7 | 1 | 22.88 | 25.12 | 25.12 | 11.74 | 0.0006683 |
| St_10 | 1 | 13 | 13.76 | 13.76 | 6.43 | 0.0115449 |
| St_14 | 1 | 8.37 | 8.37 | 8.37 | 3.91 | 0.0485987 |
| Trial | 1 | 9.36 | 9.36 | 9.36 | 4.37 | 0.0370841 |
| Error | 440 | 941.42 | 941.42 | 2.14 | | |
| Lack of Fit | 65 | 670.31 | 670.31 | 10.31 | 14.26 | 0 |
| Pure Error | 375 | 271.12 | 271.12 | 0.72 | | |
| Total | 449 | 5719.9 | | | | |

After performing the ANOVA shown in Table 4, the final model may be represented by the equation:

$$\text{Force}=0.2013+8.48157\text{ Sigmoid}+6.34606\text{ Descending Colon}+1.75874\text{ Ascending Colon}+\text{Transverse Colon}+1.50105\text{ St\_12}+1.31885\text{ St\_7}+0.976185\text{ St\_10}+0.761118\text{ St\_14}-0.176603\text{ Trial} \quad \text{Eq. 1:}$$

The final model shows that the force applied by the student generally reduced by 0.17 N in each trial. This suggests that the students improved and applied less force in the third trial as compared to the first and second trials.

Finally, the results show that the students' time to navigate each part of the colorectal tube 16 decreased significantly over each of the three trials. The model to test for reduction, or otherwise improvement, in time used the independent variables of the students, the locations within the colon, and trial number. A stepwise regression was run with all students and locations as independent binary variables. With entry and exit alphas at 0.05, the model in Table 5 below was generated. The $R^2$ for the model was 52.20%, with the adjusted $R^2$ for the model as 51.22%. Table 5 shows the results generated after running ANOVA on the time data. After performing the ANOVA shown in Table 5, the final model may be represented by the equation:

$$\text{Time}=163.875+198.133\text{ Sigmoid}-31.4267\text{ Trial}-50.5333\text{ Rectum}+69.496\text{ St\_9}+69.3627\text{ St\_14}+29.1444\text{ Ascending Colon}-55.0373\text{ St\_6}-52.5707\text{ St\_30}-47.904\text{ St\_29} \quad \text{Eq. 2:}$$

TABLE 5

| Source | DF | Seq SS | Adj SS | Adj MS | F | P |
|---|---|---|---|---|---|---|
| Regression | 9 | 3839169 | 3839169 | 426574 | 53.387 | 0 |
| Sigmoid | 1 | 2981112 | 2355409 | 2355409 | 294.784 | 0 |
| Trial | 1 | 296291 | 296291 | 296291 | 37.081 | 0 |
| Rectum | 1 | 245014 | 153217 | 153217 | 19.175 | 0.0000149 |
| St_9 | 1 | 76146 | 69659 | 69659 | 8.718 | 0.0033196 |
| St_14 | 1 | 81285 | 69392 | 69392 | 8.685 | 0.0033798 |
| Ascending Colon | 1 | 50964 | 50964 | 50964 | 6.378 | 0.011903 |
| St_6 | 1 | 38089 | 43689 | 43689 | 5.468 | 0.0198174 |
| St_30 | 1 | 37171 | 39861 | 39861 | 4.989 | 0.0260162 |
| St_29 | 1 | 33098 | 33098 | 33098 | 4.142 | 0.0424238 |
| Error | 440 | 3515731 | 3515731 | 7990 | | |
| Lack of Fit | 62 | 723177 | 723177 | 1164 | 1.579 | |
| Pure Error | 378 | 2792553 | 2792553 | 7388 | | |
| Total | 449 | 7354900 | | | | |

Figure 14:
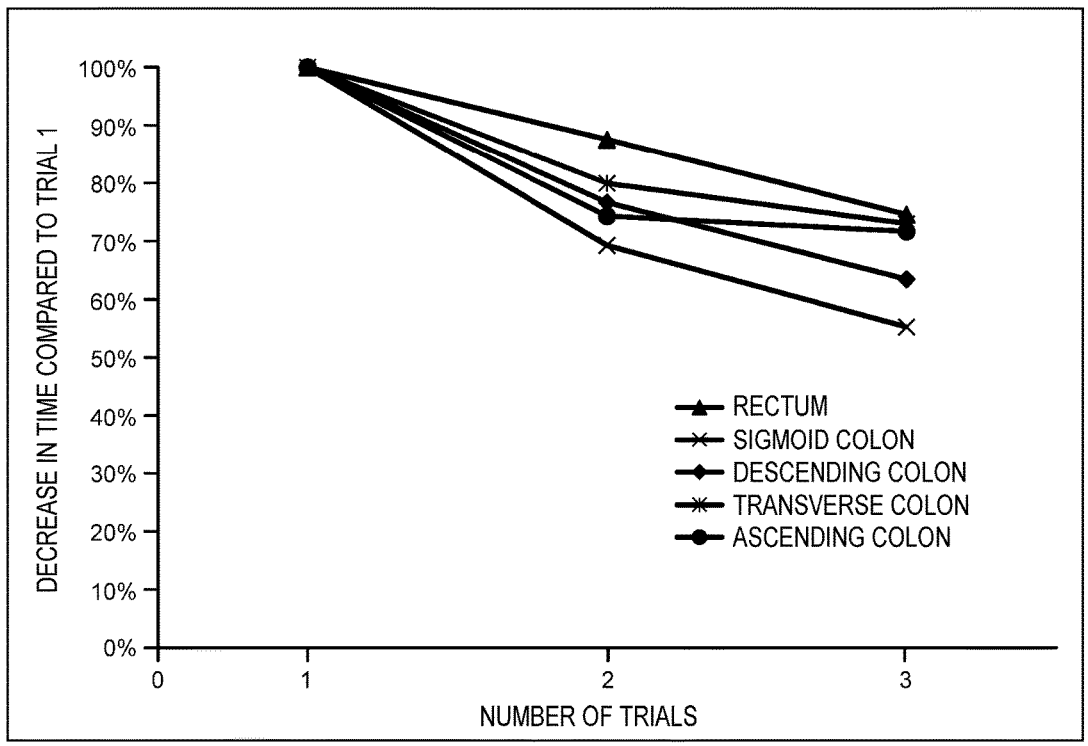
FIG. 14 is a graph of average decreased time to various positions during experimental training with the active colonoscope training model over three experimental trials.

FIG. 14 shows that the time required by the students to perform the colonoscopy decreases successively during each of the three trials. Generally, the time required by the colonoscopist to advance and retract the colonoscope 60 while providing competent analysis is a combined skill learned by professionals performing a colonoscopy. Hence, localization data, such as time data, was collected and analyzed to determine whether the ACTM 10 is effective to differentiate the individual performing the procedure on the ACTM 10. Generally, the results suggest that the students improved their hand-eye coordination for manipulating the colonoscope 60 over the three trials. Specifically, the sigmoid colon 34 is the most difficult part of the colorectal tube 16 to advance during the colonoscopy procedure for the colonoscopist and often requires more time to pass the scope as compared to the other parts of the colorectal tube 16.

Using the ACTM 10 in the above manner, the development of the student's colonoscopy skills can be evaluated by an instructor or other professional. This analysis can also be extended in the similar manner to the above force analysis in order to predict the number of trials to be performed by a student before he or she performs the colonoscopy procedure on a patient. In addition, the ACTM 10 can also be configured to provide different configurations for the colorectal tube 16 to vary the training provided by the ACTM 10. For example, the colorectal tube 16 may be configured to be relatively convoluted in order to increase the difficulty of completing the colonoscopy on the ACTM 10. Configurations where the lumen is not clearly visible can also be simulated to test the students' competence in such situations.

Some marks may be made inside the colorectal tube 16 to assess the examining skills of the students while performing the procedure.

Overall, the results of this research demonstrate that ACTM 10 is an effective simulator. The data collected indicates that the experts are significantly different from the students, but that the subsequent trials displayed student improvement with respect to their colonoscopy procedural skills such as application of force for intubation and time required to reach the cecum 42. For at least these reasons, the ACTM 10 will be an effective tool for a training program related to medical studies assessing colonoscopy procedural skills without actually operating on a patient. Similarly, the ACTM 10 may also be used to determine the learning curve of the students and evaluate the number of trials for a student to perform before he or she operates on a patient. In addition, the colorectal tube 16 may be configured in different orientations to simulate various conditions that present challenges in order to test the students' skills and understanding of the colonoscopy procedure.

While the present invention has been illustrated by a description of various embodiments, and while these embodiments have been described in some detail, they are not intended to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with methods of practicing the present invention as currently known. However, the invention itself should only be defined by the appended claims.

What is claimed is:

1. A colonoscopy training model comprising:
   an abdominal model comprising an outer body having a hollow interior portion therein;
   a colorectal tube operably coupled to the abdominal model within the interior portion of the outer body, the colorectal tube configured to replicate a human colon;
   a pressure transducer operably coupled to the colorectal tube, and
   a plurality of photocells, in communication with a data acquisition system via a sensor board, positioned within the colorectal tube and configured to detect a light emitted by the colonoscope;
   wherein the colorectal tube is configured to receive a colonoscope and the pressure transducer is configured to measure an interstitial pressure within the colorectal tube when the colonoscope is positioned therein; and
   a computer, in communication with said data acquisition system, configured to determine a position of the received colonoscope in the colorectal tube based on the detected light emitted by the colonoscope.

2. The colonoscopy training model of claim 1 further comprising:
   a plurality of fixtures operatively connected between the colorectal tube and the abdominal model, the plurality of fixtures configured to secure the colorectal tube within the hollow interior portion; and
   a plurality of load cells positioned along the colorectal tube respectively at an interface between the plurality of fixtures and the colorectal tube, the plurality of load cells configured to detect a tension applied to the colorectal tube by the colonoscope.

3. The colonoscopy training model of claim 1 further comprising:
   a data acquisition system operably coupled to the pressure transducer and configured to receive a signal from the pressure transducer.

4. The colonoscopy training model of claim 3 further comprising:
   a controller configured to control one or more of the data acquisition system and the pressure transducer.

5. The colonoscopy training model of claim 4, wherein the controller is further configured to display a graphical user interface.

6. A colonoscopy training model comprising:
   an abdominal model comprising an outer body having a hollow interior portion therein;
   a colorectal tube positioned within the interior portion of the outer body, the colorectal tube configured to replicate a human colon;
   a plurality of fixtures operatively connected between the colorectal tube and the abdominal model, the plurality of fixtures configured to secure the colorectal tube within the hollow interior portion;
   a plurality of photocells, in communication with a data acquisition system via a sensor board, positioned within the colorectal tube and configured to detect a light emitted by the colonoscope; and
   a plurality of load cells positioned along the colorectal tube respectively each at one of a plurality of interfaces between the plurality of fixtures and the colorectal tube, wherein the colorectal tube is configured to receive a colonoscope and the plurality of load cells are configured to detect a tension applied to the colorectal tube by the colonoscope when the colonoscope is positioned therein; and
   a computer, in communication with said data acquisition system, configured to determine a position of the received colonoscope in the colorectal tube based on the detected light emitted by the colonoscope.

7. The colonoscopy training model of claim 6 further comprising:
   a data acquisition system operably coupled to the plurality of load cells and configured to receive a signal from the plurality of load cells.

8. The colonoscopy training model of claim 7 further comprising:
   a controller configured to control one or more of the data acquisition system and the plurality of load cells.

9. The colonoscopy training model of claim 8, wherein the controller is further configured to display a graphical user interface.

10. A method of colonoscopy training using a colonoscopy training model comprising an abdominal model having an outer body, an anus unit positioned at one end of the outer body, a colorectal tube fixedly coupled to the anus unit and positioned within the outer body, an air pressure sensor comprising a pressure transducer operably coupled to the colorectal tube, a plurality of photocells within the colorectal tube, in communication with a sensor driver board and data acquisition system, and a computer, in communication with said sensor driver board and data acquisition system, the method comprising:
    directing a colonoscope through the anus unit of the outer body;
    advancing the colonoscope through the colorectal tube;
    measuring, by the computer, an interstitial pressure within the colorectal tube with the pressure transducer;
    monitoring, by the computer, the interstitial pressures activating at least one of the plurality of photocells when a light emitted by a distal end of the colonoscope is incident on the at least one of the plurality of photocells;

detecting, by at least one of the plurality of photocells, the light emitted by the colonoscope;

deactivating, by the computer, the at least one of the plurality of photocells when the light emitted by the distal end of the colonoscope is not incident on the at least one of the plurality of photocells; and determining, by the computer, a position of the distal end of the colonoscope in the colorectal tube based on the activating and the deactivating.

11. The method of colonoscopy training of claim 10 further comprising:

inflating the colorectal tube.

12. The method of colonoscopy training of claim 10 wherein the colonoscopy training model further includes a plurality of fixtures and a plurality of load cells, the plurality of fixtures operatively connected between the colorectal tube and the abdominal model, the plurality of load cells positioned along the colorectal tube respectively at an interface between the plurality of fixtures and the colorectal tube, the method comprising:

measuring a tension by at least one of the plurality of load cells; and determining a force applied by the colonoscope during a training session by the measured tension; and monitoring the force applied by the colonoscope.

13. A method of colonoscopy training using a colonoscopy training model comprising an abdominal model having an outer body, an anus unit positioned at one end of the outer body, a colorectal tube fixedly coupled to the anus unit and positioned within the outer body, a plurality of fixtures operatively connected between the colorectal tube and the abdominal model, a plurality of load cells positioned along the colorectal tube respectively each at one of a plurality of interfaces between the plurality of fixtures and the colorectal tube, and a computer, in communication with a sensor driver board and data acquisition system, and a plurality of photocells within the colorectal tube in communication with said sensor driver board and data acquisition system, the method comprising:

directing a colonoscope through the anus unit of the outer body;

advancing the colonoscope through the colorectal tube;

measuring, by the computer, a tension by at least one of the plurality of load cells;

determining, by the computer, a force applied by the colonoscope during a training session by the measured tension;

monitoring, by the computer, the force applied by the colonoscope;

activating at least one of the plurality of photocells when a light emitted by a distal end of the colonoscope is incident on the at least one of the plurality of photocells;

detecting, by at least one of the plurality of photocells, the light emitted by the colonoscope;

deactivating, by the computer, the at least one of the plurality of photocells when the light emitted by the distal end of the colonoscope is not incident on the at least one of the plurality of photocells; and determining, by the computer, a position of the distal end of the colonoscope in the colorectal tube based on the activating and the deactivating.

* * * * *